J. W. MILLER.
BUTTON MAKING MACHINE.
APPLICATION FILED DEC. 7, 1907.

919,914.

Patented Apr. 27, 1909.
8 SHEETS—SHEET 1.

Witnesses:

Inventor:
John W. Miller
By Cyrus W. Rice Atty.

J. W. MILLER.
BUTTON MAKING MACHINE.
APPLICATION FILED DEC. 7, 1907.

919,914.

Patented Apr. 27, 1909.
8 SHEETS—SHEET 2.

Witnesses:
I. A. Naubenschmidt
Robert J. Nicholson

Inventor:
John W. Miller
By Cyrus W. Rice Atty

J. W. MILLER.
BUTTON MAKING MACHINE.
APPLICATION FILED DEC. 7, 1907.

919,914.

Patented Apr. 27, 1909.
8 SHEETS—SHEET 4.

Witnesses:

Inventor
John W. Miller

By Cyrus W. Rice Atty.

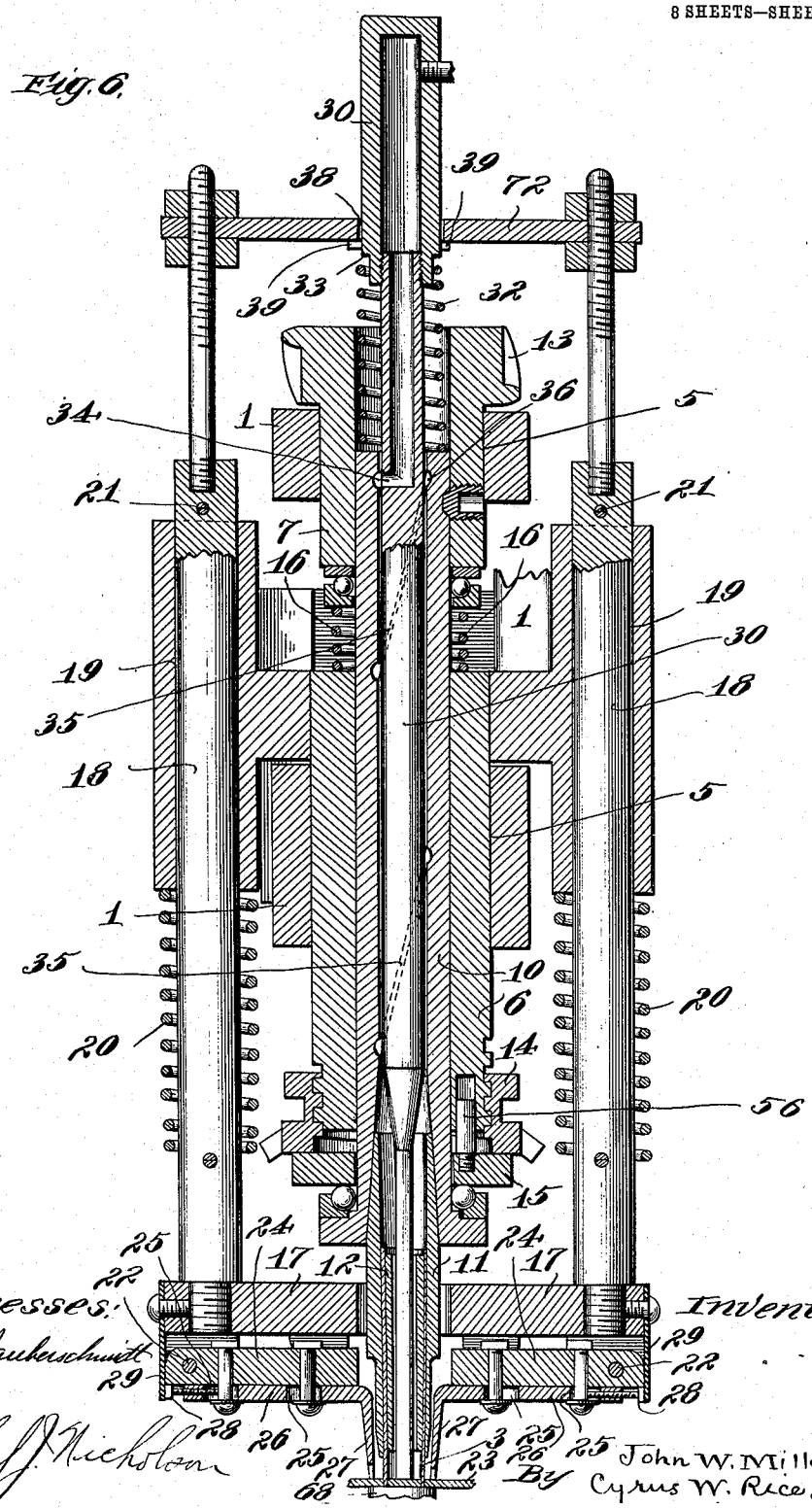

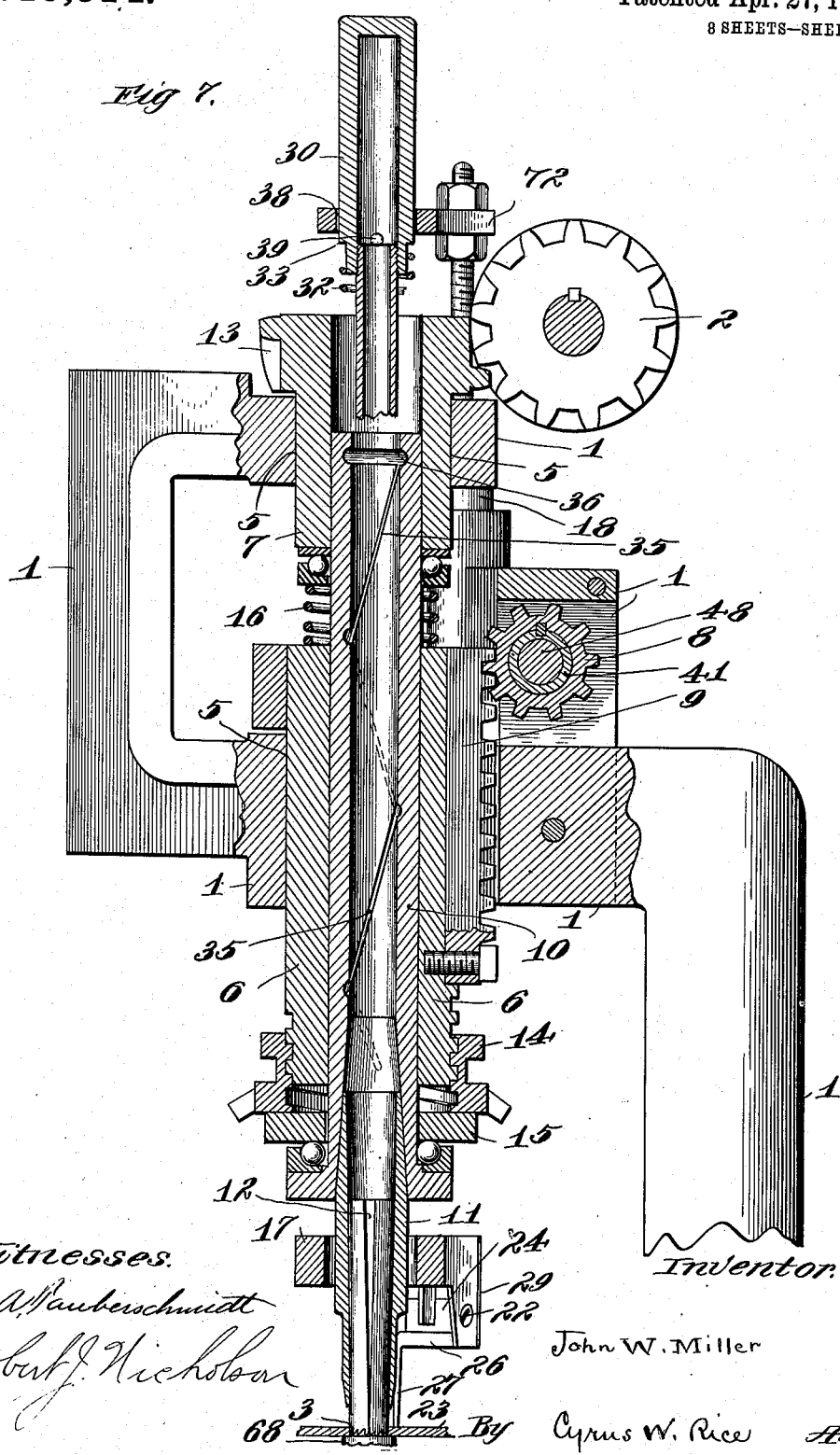

J. W. MILLER.
BUTTON MAKING MACHINE.
APPLICATION FILED DEC. 7, 1907.
919,914.
Patented Apr. 27, 1909.
8 SHEETS—SHEET 7.
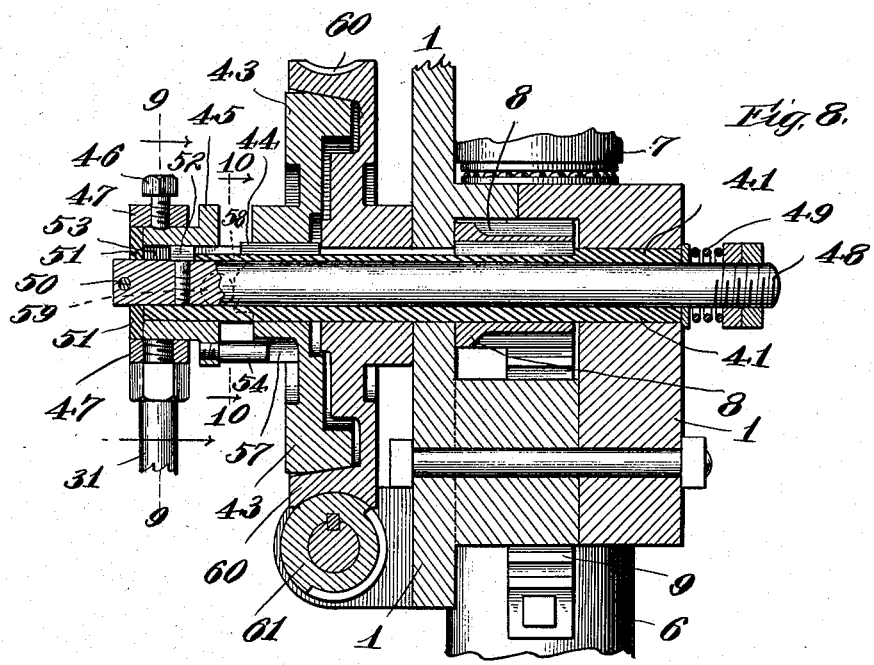
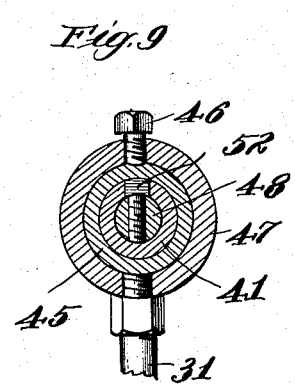
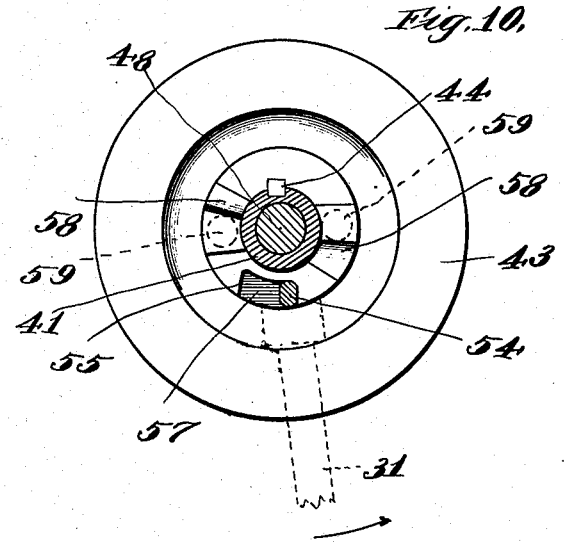
Witnesses:
G. A. Paulenschmidt
Robert J. Nicholson
Inventor:
John W. Miller
By Cyrus W. Rice Atty.

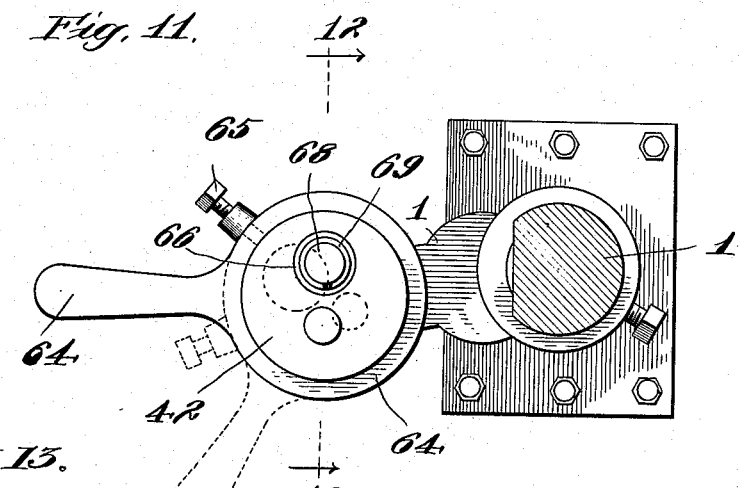
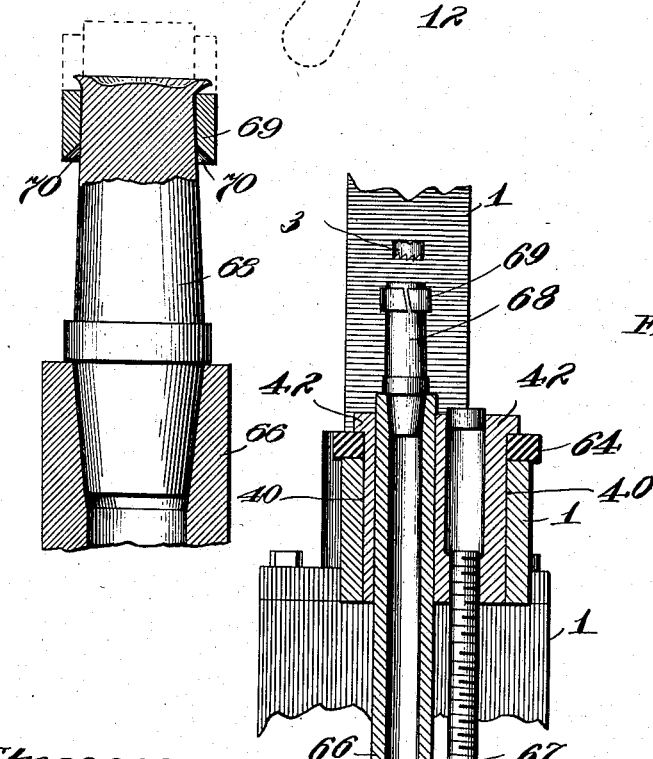

UNITED STATES PATENT OFFICE.

JOHN W. MILLER, OF MUSCATINE, IOWA.

BUTTON-MAKING MACHINE.

No. 919,914.　　Specification of Letters Patent.　　Patented April 27, 1909.

Application filed December 7, 1907. Serial No. 405,496.

*To all whom it may concern:*

Be it known that I, JOHN W. MILLER, a citizen of the United States, and a resident of the city of Muscatine, in the county of Muscatine and State of Iowa, have invented a certain new and useful Button - Making Machine, of which the following is a specification.

My invention relates to machines for making buttons from mother of pearl material, etc., and its principal object is to provide such a machine whose operations may be controlled by a single hand-operated part, and its other objects will more fully appear hereinafter. These objects are attained by, and my invention is embodied in, the following described mechanism, illustrated by the accompanying drawings, in which—

Figure 1:
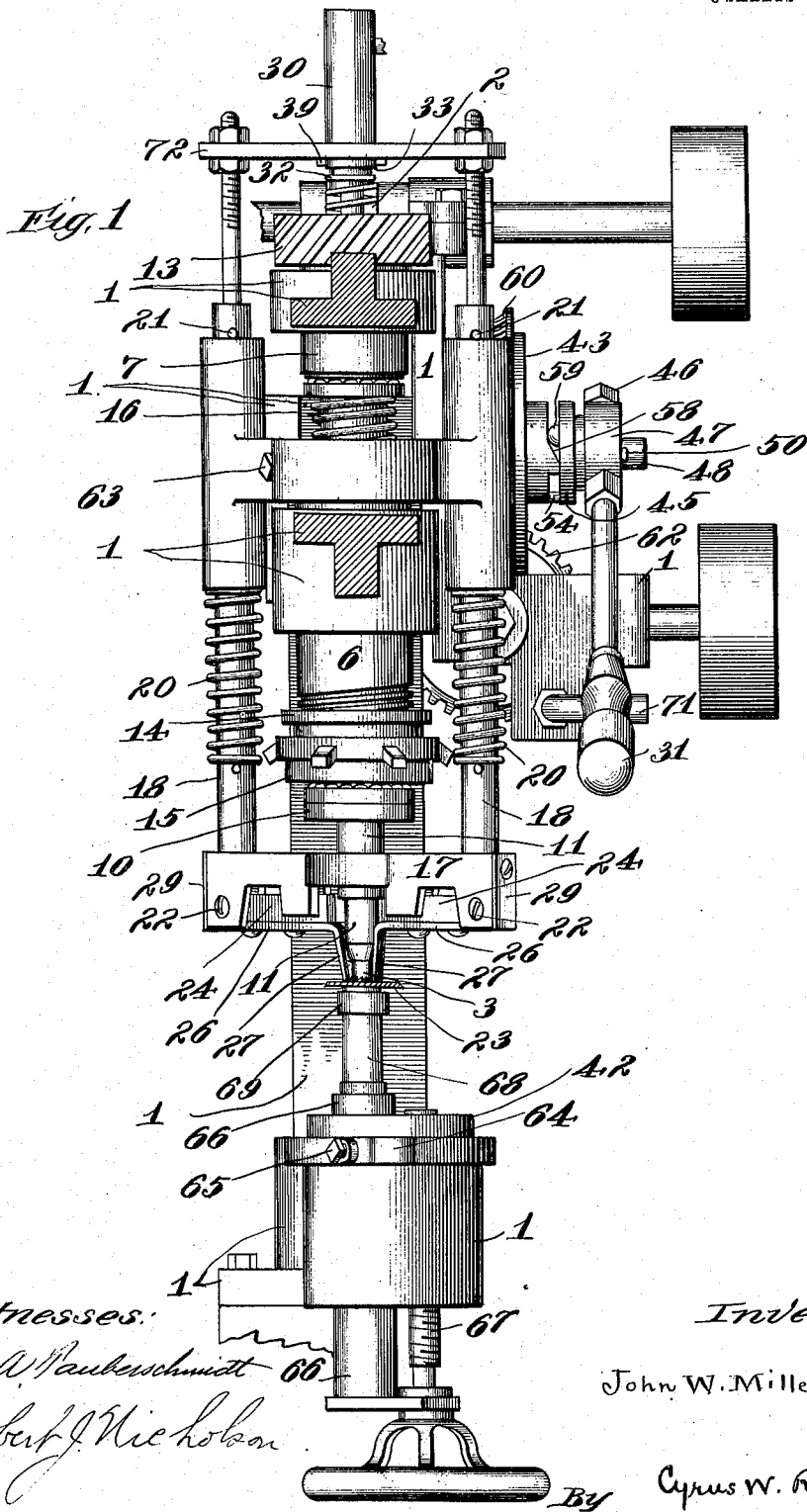
Figure 2:
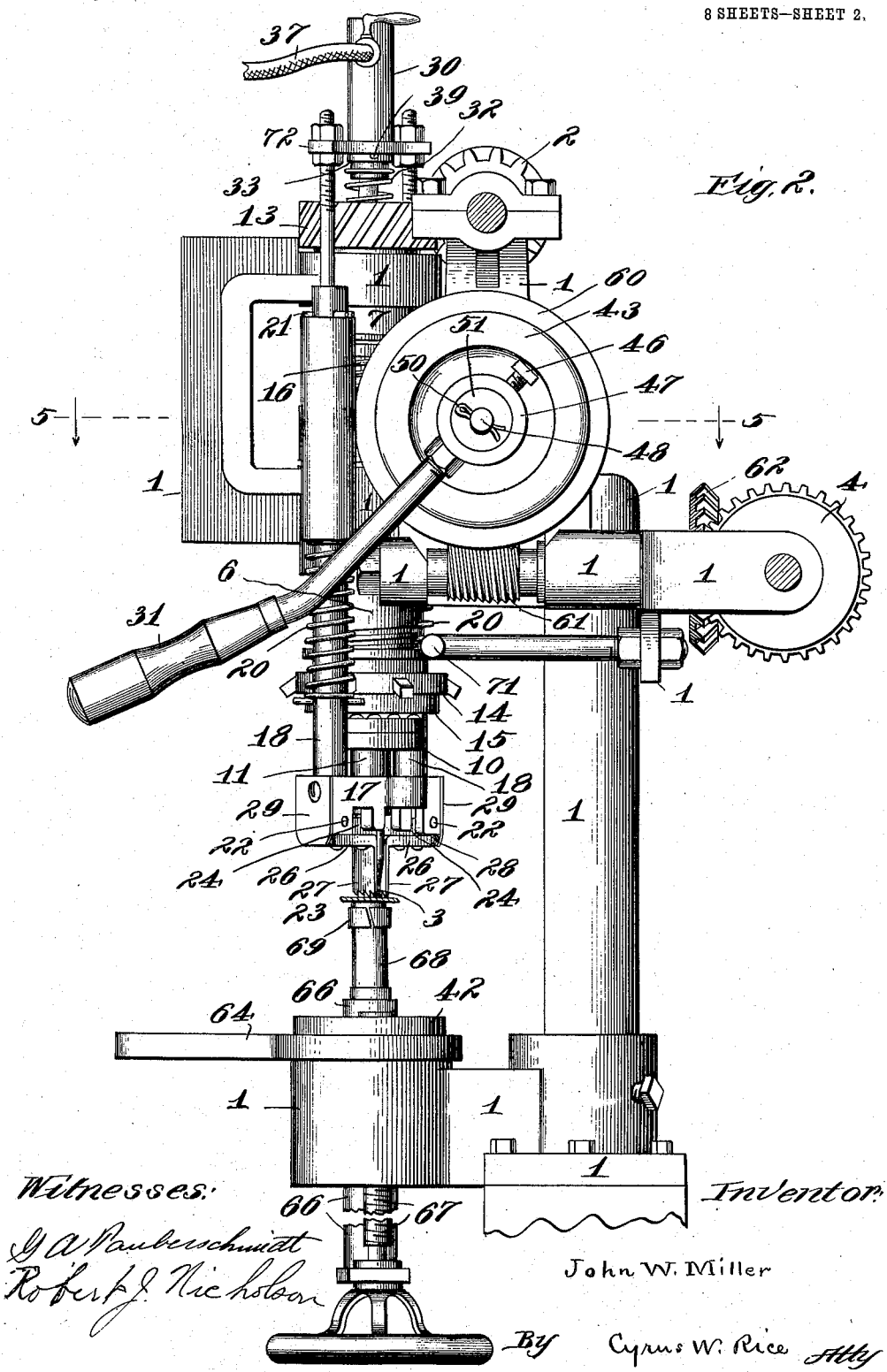
Figure 3:
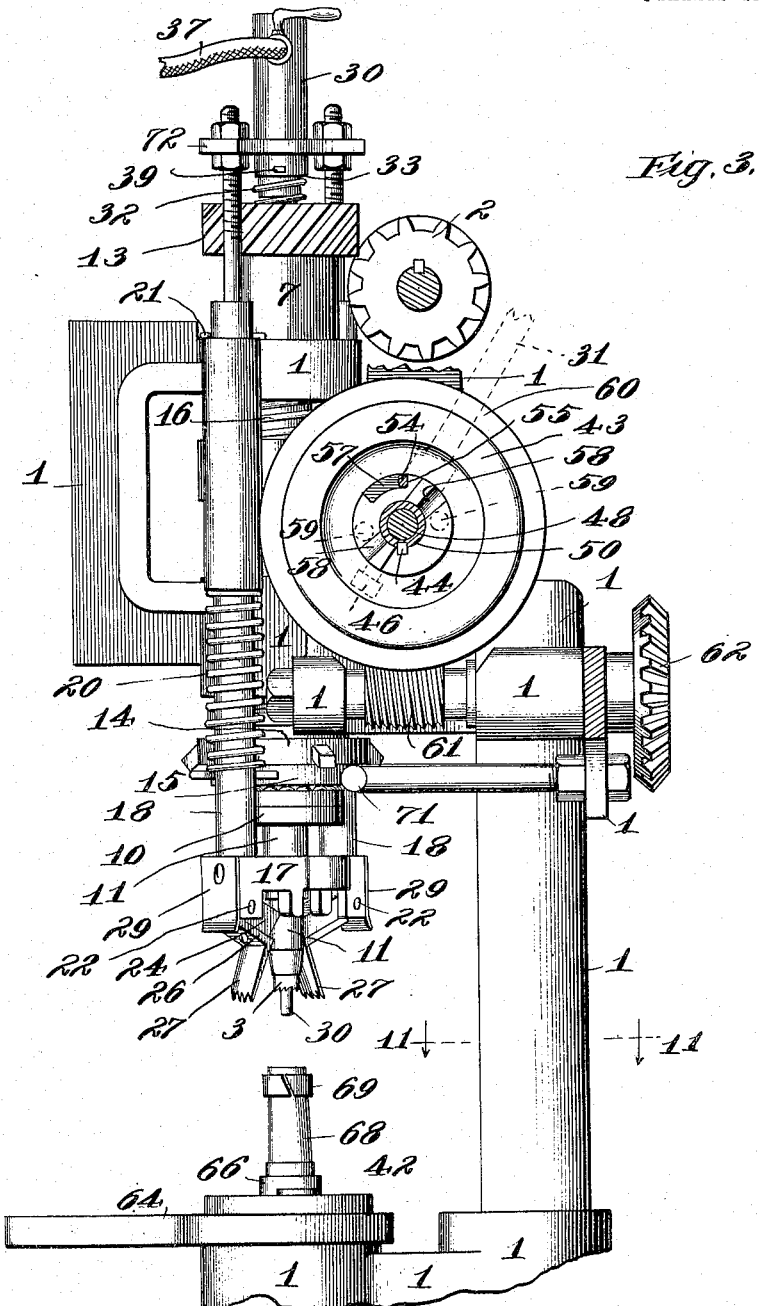
Figure 4:
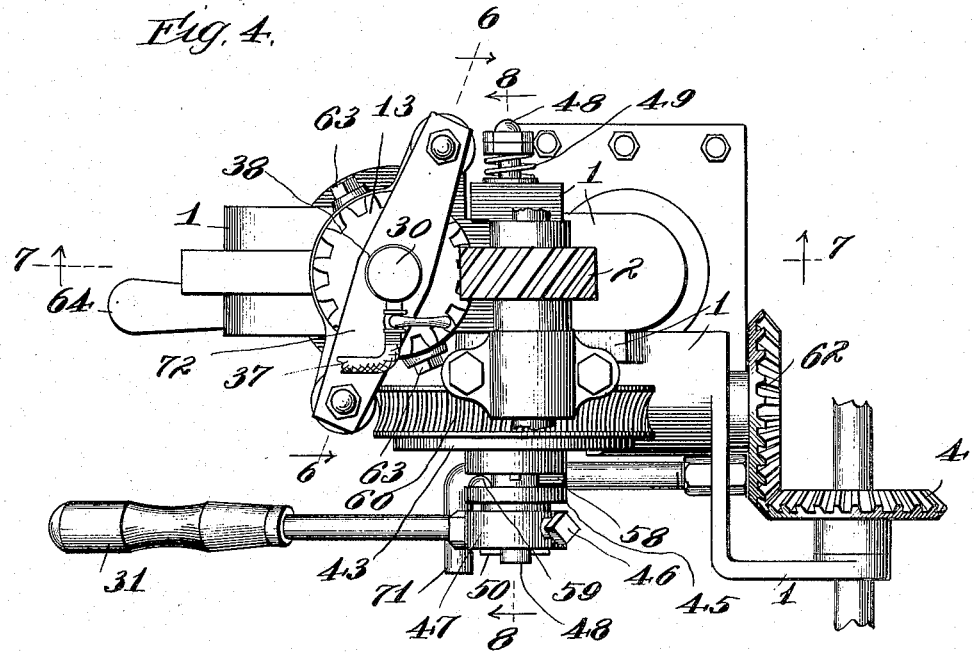
Figure 5:
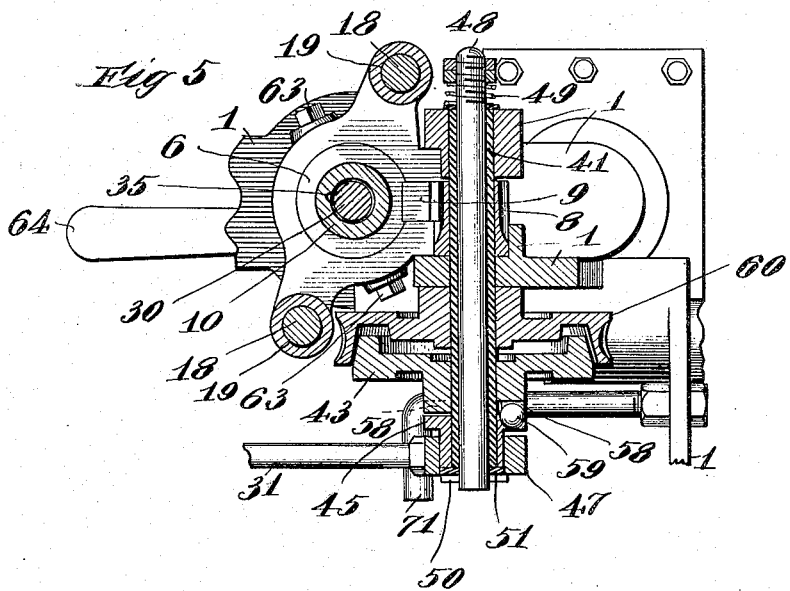

Figure 1 is a front elevation of my button making machine viewed from the position of the operator; Fig. 2 is a side elevation thereof; Fig. 3 is also a side elevation of the same, with the operating handle, etc., removed, and the lower portion broken away; Fig. 4 is a plan or top view of my machine; Fig. 5 is a horizontal section thereof on line 5—5 of Fig. 2; Fig. 6 is a vertical section of my machine (the lower portion broken away) on line 6—6 of Fig. 4; Fig. 7 is also a vertical section of the same on line 7—7 of Fig. 4; Fig. 8 is a vertical section of the tool-feeding mechanism, etc., on line 8—8 of Fig. 4; Fig. 9 is a detail view showing in vertical section part of the tool-feeding mechanism, etc., on line 9—9 of Fig. 8; Fig. 10 is a detail view showing in vertical section part of such tool-feeding mechanism, etc., on line 10—10 of Fig. 8; Fig. 11 is a detail, a plan or top view of the material- seat mechanism, my machine being sectioned for this view on line 11—11 of Fig. 3; Fig. 12 is a vertical section of the material-seat mechanism on line 12—12 of Fig. 11; and Fig. 13 is a detail view of the material seat on which the work rests, with its socket and ferrule shown in vertical section.

In bearings on the main frame 1 rotates a power-conveying shaft with its skew gear 2 meshing with the skew gear 13 by which the cutting tool 3 is rotated, and also a power-conveying shaft with its gear 4 by which the tool-feeding mechanism is operated.

In bearings 5 on the main frame the tool-carrying mechanism moves vertically, the sleeve 6 and the hollow mandrel 10 (having the skew gear 13 borne by its upper portion or keyed sleeve 7) sliding in said bearings, the keyed sleeve 7 rotating also therein. This vertical sliding movement is imparted and controlled, as hereinafter explained, through the gear 8 meshing with the rack 9 borne by the sleeve 6. The lower or main portion of the mandrel 10 has its bearing in the sleeve 6. In a tapered friction bearing, as shown, the mandrel 10 at its lower end holds and rotates the hollow tool holder or saw spool 11 tapered to fit such bearing, which tool holder 11 contains and rotates with it the rotary cutting tool or crown saw 3 as shown, which is keyed in position by the hollow conical key 12. A screw collar 14 threaded on the sleeve 6 and having lugs for turning as shown, serves to adjust the position of the mandrel by raising or lowering the same relatively to the sleeve 6. Balls as shown in the bearing between the mandrel 10 and the washer 15 (in spline-like engagement at 56 with the sleeve 6 as shown in Fig. 6) serve to lessen the friction. The mechanism is tightened and the friction reduced by a strong spring 16 pressing (with ball bearings as shown) between the upper end of the sleeve 6 and the shoulder formed by the lower extremity of the keyed sleeve 7 of the mandrel 10.

A material - holding mechanism to securely hold the material 23 operated on, is borne by the tool-carrying mechanism. This material - holding mechanism has a main body 17 pierced to allow the passage therethrough of the tool holder 11 and provided with slides 18 moving vertically a short distance in bearings 19 secured, as by the screws 63, to the sleeve 6. These slides are pressed downward by strong springs 20, their action being limited by stops 21. Pivoted at 22 on the body 17 are the oppositely disposed lever arms 24 which carry on slotted bearings 25 the material holders or grippers 26 having downwardly and slightly inwardly projecting fingers 27 whose lower extremities are serrated as shown to engage and securely hold the work or material 23. Adjusting screws 28 whose heads are pressed by the leaf springs 29 on the body 17 serve to adjust the grippers on their bearings 25 to tool holders 11 of different diameters. The grippers 26 and their fingers 27 being of stiff spring material and the fingers being concaved inwardly as shown, may be pressed (the screws 28 being properly adjusted), by the weight of the mechanism supported by the fingers and by the pressure of the springs 20, against the lower part of the tool holder 11 thus forming for it a bearing or lateral support near the work.

The rotary cutting tool, a crown saw 3 as shown, is of hollow cylindrical form and slit longitudinally. A key 12, in form the hollow frustum of a cone, is driven into the hollow saw from above and, opening the slit from the top, serves to tightly hold the saw in position in its holder or spool 11.

When the cutting of a blank is finished it is expelled from the saw by the cylindrical plunger 30 around which rotates on a free bearing the mandrel 10. This plunger 30 extends downward within the hollow tool holder 11, hollow tool 3, and hollow key 12, and rests at its lower extremity on the part of the material from which the blank is cut during the cutting operation. The blank being cut, the tool-carrying mechanism (including the tool, mandrel, etc.) rises, the material-holding mechanism still resting on the work (such rising being effected by the springs 20 in the interval between the automatic stopping of the feed of the tool and the raising by hand of the lever handle 31 for a new cutting—all as hereinafter explained) and starts with it the plunger resting on blank still held in the saw. The plunger is immediately arrested by its lug 39 striking the stop bar 72 which is pierced at 38 to allow the sliding movement therethrough of the upper end of the plunger and is carried by screw adjustments as shown on the slides 18, which slides during this action of the springs 20 remain stationary, resting through the fingers, etc., on the material. When the blank is thus forced out of the saw the plunger falls by its weight a short distance until arrested by its shoulder 33 striking the spring 32 which rests on the mandrel 10 and relieves the jar. This position of the plunger is shown in Fig. 3. The plunger is hollow in its upper portion as shown, with a vent 34 through its wall, communicating with an annular gutter 36 in the internal surface of the mandrel 10; from this annular gutter a helical gutter 35 in the internal surface of the mandrel winds downward turning in a direction contrary to the rotation of the tool. Water being admitted into the top of the plunger through a flexible tube 37, descends into the helical gutter and is forced downward by the mandrel's rotation in a rotating column through the hollow tool holder 11 and hollow key 12 upon the material, thus serving to cool the saw and to clear away its cuttings.

The tool-feeding mechanism is particularly shown in Fig. 8 and is as follows: In bearings on the main frame 1 a sleeve 41 is rotated as hereinafter explained. To this the gear 8 is keyed, and the conical friction-clutch wheel 43 is splined at 44. Turning on the sleeve 41 and near its extremity is the ball-carrying sleeve 45 on which is adjusted, as by set screw 46, a suitable collar 47 carrying the only hand-operated part of the entire machine necessary to its operation, the lever handle 31. These parts are held together on a central spindle 48, having the pin 50 and washer 51, by the spring 49 pressing during the cessation of the tool-feeding the sleeve 41 against the stop 52 carried by the spindle, (the sleeve 41 being slotted longitudinally at its end, at 53, to receive this stop as shown) and also pressing during the tool-feeding, and to effectuate the same, the sleeve 41 and the sleeve 45 toward each other by means of the washer 51. The sleeve 45 carries the pin or lug 54 operating as hereinafter described to strike the stop 55 formed by one end of the slot 57 in the face of the clutch wheel 43 and thus rotate it. On the face of the clutch wheel 43 rise the cams 58, oppositely disposed as shown, on which cams travel and on their summits rest the balls 59 carried by the sleeve 45. By this mechanism the friction clutch wheel 43 is thrown (by pressing the lever handle 31 downward and away from the operator) into its friction engagement with the corresponding friction-clutch idle gear wheel 60 which is rotated by the worm gear 61 turned by the bevel gears 4 and 62, thus feeding the tool down by the gear 8 and rack 9. The feeding of the tool is stopped by the lever handle 31 striking a stop 71 on the main frame 1 as hereinafter explained.

The lower part of the main frame 1 carries the material-seat mechanism. This comprises a rotary bearing 40 (in the main frame) which sustains the eccentric 42 rotatable in said bearing as by a suitable handle 64 keyed to the eccentric at 65. A material-seat socket 66 is adapted to slide vertically in a bearing in the eccentric, being adjustable to a desired height by a hand screw 67. This socket 66 is hollow its entire length and receives and holds at its upper end the material-seat 68 which may be drive out by a blow on the pin inserted from below. The bearing of the socket 66 is placed a sufficient distance from the axis of the eccentric 42 that the material-seat 68 (which during the cutting operation is directly under the tool) may by turning the handle 64 be moved out of the way of the tool, so that such tool and its holder 11 may be easily removed and replaced. The material-seat 68 on which the work is supported during the cutting operations is preferably of turned wood, slightly tapering toward the top. It is provided at its upper end with a split ferrule 69 which is tapered or beveled internally at its lower edge, at 70, as shown in Fig. 13, so that, as the seat wears away, the ferrule is gradually forced down on the tapering seat by the turning over of the wood fibers of the seat, as illustrated in Fig. 13.

My button making machine is operated in the following manner as illustrated in the drawings, Fig. 3 of which shows the tool-carrying mechanism raised by the lever handle 31 to its highest position, in which position the rotation of the tool ceases by reason of the skew gear 13 being carried above and out of engagement with the skew gear 2. The tool-carrying mechanism may be raised to this height in order to facilitate the replacing of tools, etc., for which purpose also the fingers 27 and the lever arms 24 may be forced downward by hand against the pressure of the leaf springs 29 as shown in Fig. 3. It will be seen that the tool holder 11 may be thus removed without loosening a single screw or nut or stopping the power; and where several machines are supplied by the same power shaft, such adjustments may be made in one machine without interfering with the operation of the others. Unless so forced down as shown in Fig. 3, the fingers 27 and lever arms 24 are held by the leaf springs 29 in the position shown in the other drawings.

When the material 23 is placed on the material-seat 68 and the lever handle 31 is moved by hand toward the operator and then down from its position shown in dotted lines in Fig. 3, the skew gear 13 slides into operative engagement with the rotating skew gear 2, the tool thus beginning to rotate, and the lever handle being released from the hand, the weight of the tool-carrying mechanism is supported by the fingers 27 resting on the material 23 which is thus held in position for cutting. The plunger 30 also rests on the blank to be cut. The position of the parts at this time is shown in Figs. 1 and 2. The lever handle is then pressed downward by hand and thus carries the balls 59 up and on the summits of the cams 58. This action forces the friction clutch wheel 43 into operative engagement with the gear 60, which has hitherto turned idly, being rotated by the worm gear 61. By this friction engagement the sleeve 41 and gear 8 are rotated by power supplied through the gears 4 and 62 and the tool is fed downward by the rack 9. As the feeding begins and progresses the springs 20 are compressed by the descent of the tool. By the friction engagement created by the spring 49 operating through the balls 59, sleeves 41 and 45, etc., the lever handle is carried downward with the rotation of the gear 60 until the handle 31 strikes the stop 71 when, the rotation continuing, the balls 59 are rolled down and off the cams 58, thus releasing the friction clutch 43, stopping the rotation of the gear 8, etc., and arresting the feeding of the tool. This stop 71 is adjusted to arrest the tool feeding when the cutting of the blank is finished. The parts at this instant are in the position shown in Figs. 6 and 7. Immediately the friction clutch is disengaged by the stop 71, causing the feeding to cease, the springs 20 raise the tool out of its kerf thus preventing unnecessary wear, and the blank is expelled by the plunger 30 as hereinbefore explained, but the fingers 27 still rest on the material, holding it in place by the weight of the tool-carrying mechanism and the material-holding mechanism as before the beginning of the feeding of the tool, thus making it unnecessary to hold the material by hand until the operator is ready to reposition it for a new cutting. The expansion of the springs 20 when the tool feeding ceases also contributes to the ease of the operator, such expansion serving to automatically raise a part of the way a part of the weight necessary to be lifted in order to make another positioning of the material, and the compression of the springs 20 as the feeding of the tool progresses serves to more securely hold the material in position, by reinforcing the weight of the mechanisms borne by the material. The blank being cut and expelled from the saw, the lever handle is raised by hand, but not necessarily so high as to carry the skew gear 13 out of engagement as shown in Fig. 3. This movement carries the lug 54 against the stop 55 (clearly illustrated in Figs. 8 and 10), and continuing, thus rotates the clutch wheel 43, sleeve 41 and gear 8 and raises by the rack 9 the tool-carrying mechanism and with it by the stops 21 the material-holding mechanism including the fingers 27, high enough to reposition by hand the material 23 on its seat 68 for a new cutting.

It will be seen that, inasmuch as the material is securely held on its seat until the lever handle is raised, one person can operate several machines, positioning the material in one while the others are cutting; also that there being a pair of fingers 27 with an opening between them, the operator may see through such opening the exact position of the tool upon the work and may place the material to the best advantage; also that the material-seat being stationary and its face horizontal, the material is easily handled and retained in position.

The conical key 12 with coöperating parts is to be made the subject matter of a divisional or separate application for patent.

It is evident that my invention may be embodied in other and varying mechanisms without departing from its scope and spirit; and therefore I do not propose to confine myself to the details of construction shown and described.

I claim:

1. In a machine of the character described, a rotatable tool holder, a controlling handle, an automatic tool feeding mechanism, a material holder, means intermediate said handle and the tool feeding mechanism to initiate by said handle the operation of the tool feeding mechanism, and means intermediate said handle and the material holder to control by said handle the operation of the material holder independently of the tool feeding mechanism.

2. In a machine of the character described, a rotatable tool holder, a controlling handle, an automatic tool feeding mechanism, a material holder, means intermediate said handle and the tool holder to move by said handle the tool holder axially and independently of the tool feeding mechanism, means intermediate said handle and the tool feeding mechanism to initiate by said handle the operation of the tool feeding mechanism, and means intermediate said handle and the material holder to control by said handle the operation of the material holder independently of the tool feeding mechanism.

3. In a machine of the character described, a frame, a rotatable tool holder movable on the frame in the direction of its axis, a material holder movable with the tool holder a part of the tool holder's travel and movable relatively to the tool holder another part of such travel, an automatic tool feeding mechanism intermediate the frame and the tool holder, a seat on which the material is held by the material holder, an operating handle on the frame, means intermediate said handle and the tool holder to move the tool holder by said handle independently of the tool feeding mechanism, and means intermediate said handle and the tool feeding mechanism to initiate by said handle the operation of the tool feeding mechanism.

4. In a machine of the character described, a frame, a rotatable tool holder movable on the frame in the direction of its axis, a material holder movable with the tool holder a part of the tool holder's travel and movable relatively to the tool holder another part of such travel, an automatic tool feeding mechanism intermediate the frame and the tool holder, a seat on which the material is held by the material holder, an operating handle on the frame, means intermediate said handle and the tool holder to move the tool holder by said handle independently of the tool feeding mechanism, means intermediate said handle and the tool feeding mechanism to initiate by said handle the operation of the tool feeding mechanism, and means intermediate said handle and the material holder to control by said handle the material holder's operation.

5. In a machine of the character described, the combination of a frame, a vertically axial rotatable tool holder movable vertically on the frame, an automatic tool feeding mechanism, means for automatically stopping the operation of the tool feeding mechanism, a material holder vertically movable with the tool holder and also by the operation of the tool feeding mechanism movable relatively to the tool holder, a seat on which the material is held by the weight of the material holder, a spring intermediate the material holder and the tool holder compressed during the operation of the tool feeding mechanism by the relative movement of the tool holder and the material holder to reinforce the action of the material holder and expanding at the automatic cessation of the operation of the tool feeding to raise the tool holder from the work while the material holder still rests by gravity thereon, a controlling handle, means intermediate said handle and the material holder to move by said handle the material holder vertically, and means to initiate by said handle the operation of the tool feeding mechanism.

6. In a machine of the character described, the combination of a frame, a rotatable tool holder movable on the frame in the direction of its axis, a shaft rotatable on the frame, means to move the tool holder axially by the rotation of the shaft, a power-driven clutch member splined on the shaft, a controlling handle-bearing collar on the shaft having a limited turning movement thereon with respect to the clutch member, means intermediate the collar and the clutch member adapted to throw the clutch member into its engagement and actuated by turning the collar, and a stop on the frame adapted to arrest the rotation of the collar to disengage the collar and clutch member.

7. In a machine of the character described having a tool holder, a material holding mechanism having a body, a lever arm pivoted on the body and carrying a gripper adjacent the tool, and a spring pressing the gripper toward the tool holder.

8. In a machine of the character described, a rotatable tool-carrying mandrel having a helical water way winding toward the work and turning in the direction contrary to the direction of the rotation of the mandrel.

9. In a machine of the character described, the combination of a tubular rotatable tool-carrying mandrel having in its inner surface a helical water way winding toward the work and turning in the direction contrary to the direction of the rotation of the mandrel, and a spindle around which the mandrel rotates forming with the mandrel the walls of the helical way.

10. In a machine of the character described, a material-supporting seat slightly tapering toward its face and provided with a split ferrule beveled internally at its lower edge.

In testimony whereof, I have signed my name to this specification in the presence of two subscribing witnesses.

JOHN W. MILLER.

Witnesses:
F. A. THORNTON,
A. P. BRUGGE.